Feb. 17, 1970     S. LAROCHE     3,495,369
COMPOUND CURVED BUILDING ELEMENTS ATTACHED END TO END
Filed April 25, 1967     5 Sheets-Sheet 3
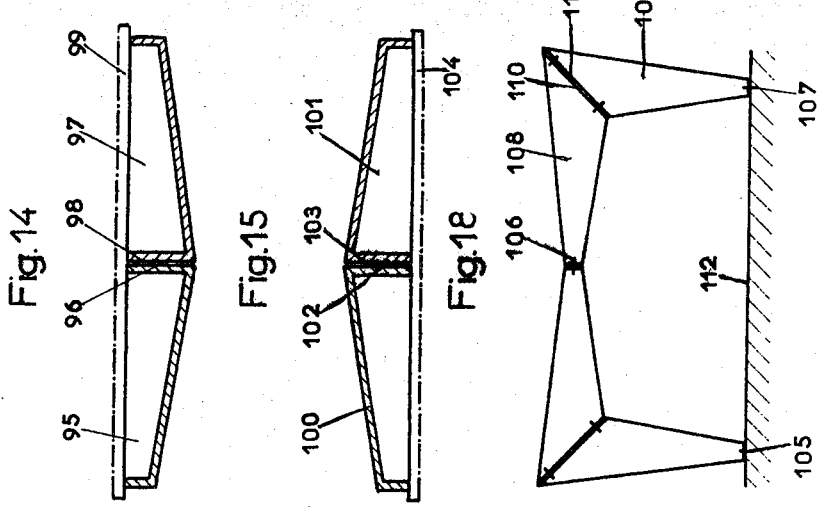
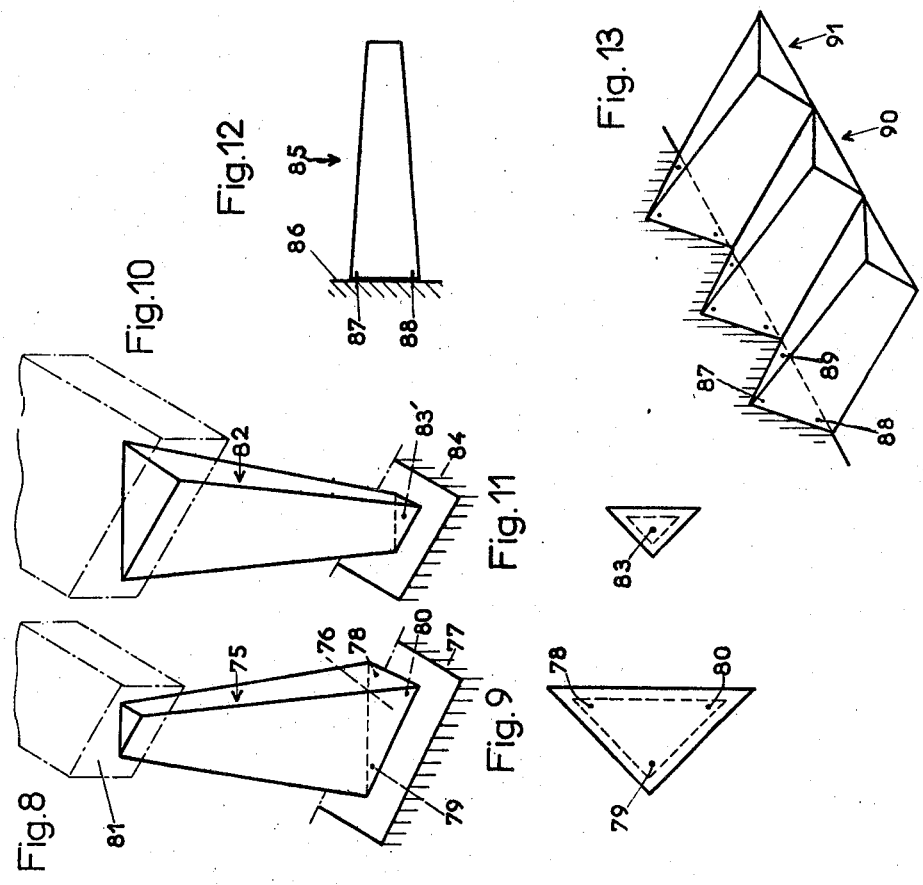

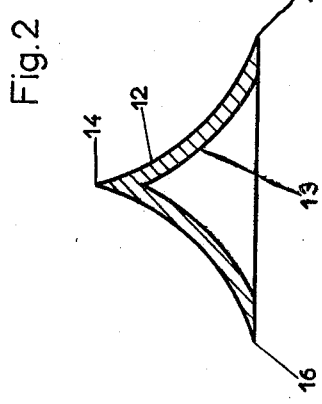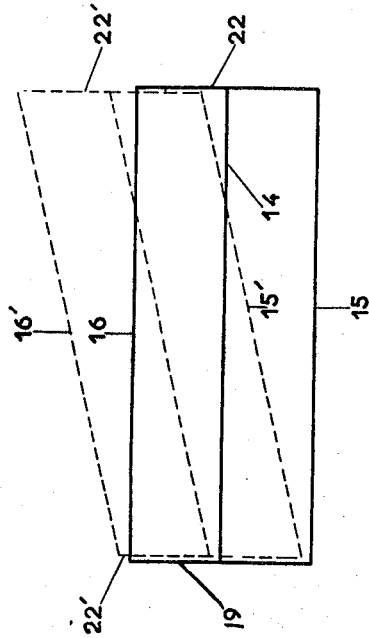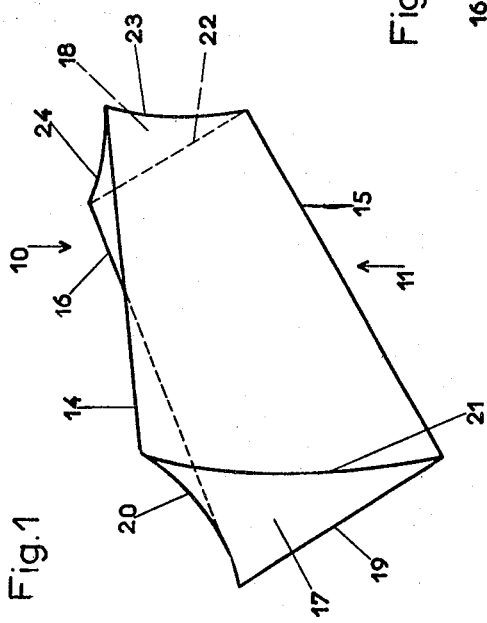

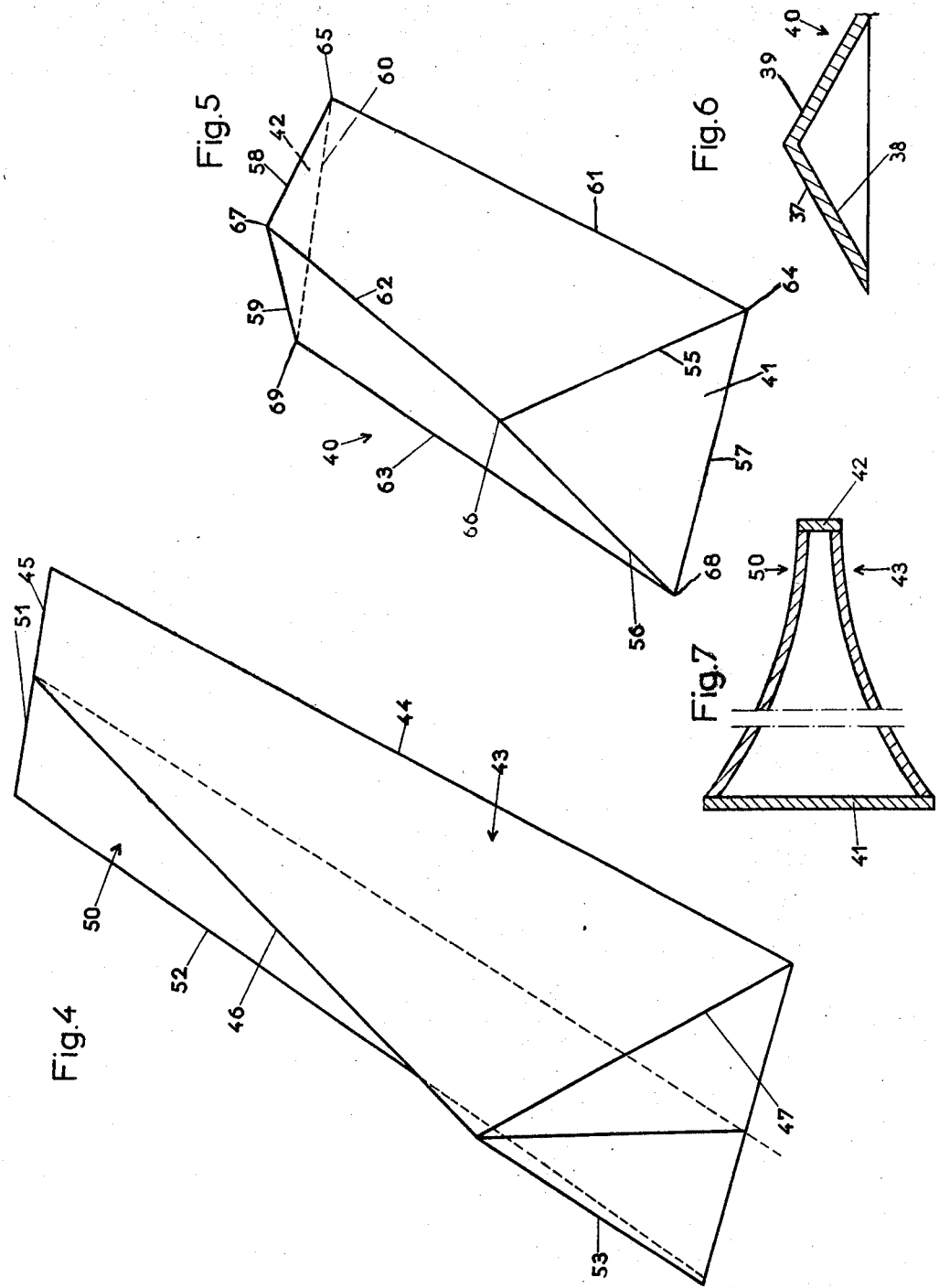

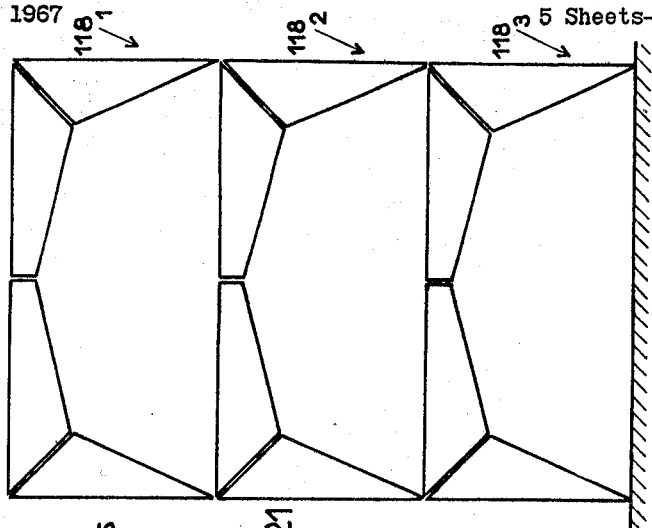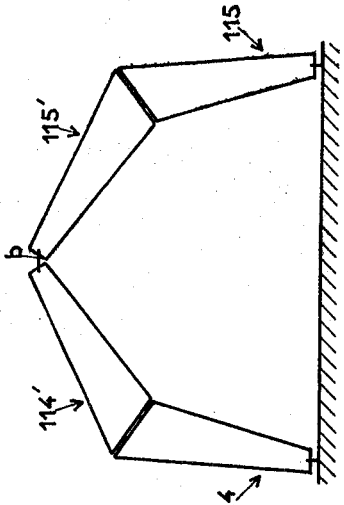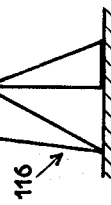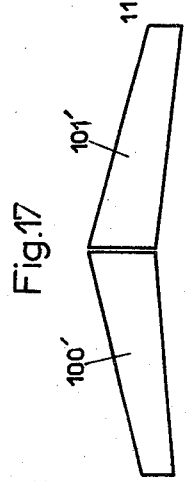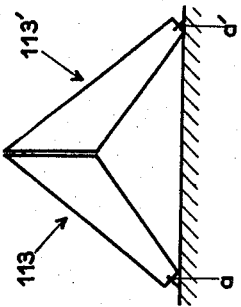

Feb. 17, 1970  S. LAROCHE  3,495,369
COMPOUND CURVED BUILDING ELEMENTS ATTACHED END TO END
Filed April 25, 1967  5 Sheets-Sheet 5

United States Patent Office 3,495,369
Patented Feb. 17, 1970

3,495,369
COMPOUND CURVED BUILDING ELEMENTS
ATTACHED END TO END
Serge Laroche, 162 Rue David Johnston,
Bordeaux, Gironde, France
Filed Apr. 25, 1967, Ser. No. 633,461
Claims priority, application France, Apr. 26, 1966,
59,087
Int. Cl. E04b 1/32; E04c 1/12
U.S. Cl. 52—608                                              11 Claims

ABSTRACT OF THE DISCLOSURE

An elongated building element having two lateral walls joined along a common rectilinear edge, in which each wall is shaped as a surface with opposite double curvature. A first end tympanum is disposed transverse to said rectilinear edge and is connected to two respective edges of the lateral walls while a second end tympanum is positioned transverse to the rectilinear edge and is connected to two opposite resepctive edges of the lateral walls to define a thin shell which is open at its side opposite the rectilinear edge.

The invention relates to a building element.

It is an object of the present invention to provide a building element which can find application in the realization of various portions of a building.

It is therefore an object of the invention to provide a relatively thin, although sufficiently strong building element which can be used as a component of the framework of a building.

It is also an object of the invention to provide a lightweight building element, the ready use of which permits its utilization as a covering or as a filling element.

It is another object of the invention to provide a building element which will satisfy the various conditions of use in structures liable to be submitted to important unsymmetrical stresses.

It is also an object of the invention to provide a building element which can be mass-produced according to industrial methods, resulting in a low cost price.

A further object of the invention is to provide such a building element which can be made from various materials, which has a pleasant appearance, and which is appropriate to develop the possibilities offered to the architect.

In this respect, it is an object of the invention to provide a building element which, due to its easy assembly and dis-assembly and its multiple uses can be employed in the construction of a wide variety of buildings as well for small structures which can be dismantled as for important permanent structures.

For the fabrication of such elements, the invention takes advantage of the properties of smooth skew surfaces and particularly of those with double inverse curvature, as regards the resistance to stresses and the transmission thereof. An example of such a surface is a hyperbolic paraboloid.

A building element according to the invention is characterized by the fact that it is laterally limited by two ruled surfaces, symmetrical in relation to a plane passing through their common edge of intersection, the two longitudinal ends of the element comprising flat portions or tympanums.

In a particularly advantageous embodiment of the invention, the lateral limiting surfaces are hyperbolic paraboloid portions secant along a rectilineal edge.

Figure 25:
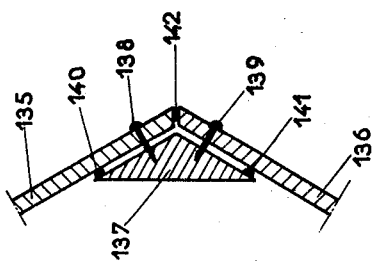
Figure 26:
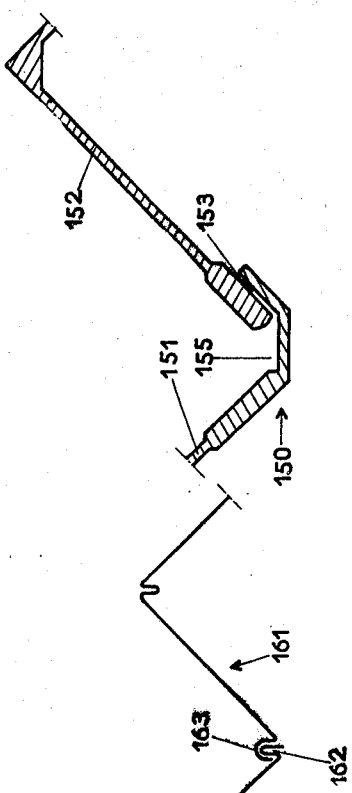
Figure 27:
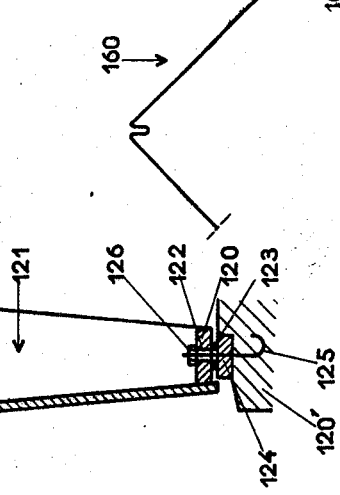
Figure 24:
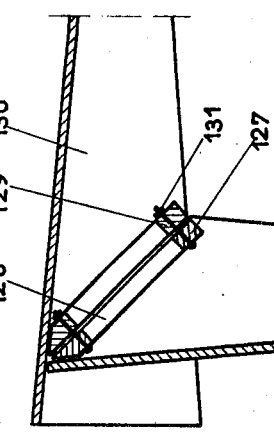

The invention will be clearly understood from the following examples of embodiments described with reference to the appended drawings, wherein:

FIGURE 1 is a schematic perspective view of a building element according to the invention;
FIGURE 2 is a cross-sectional view of the element illustrated in FIGURE 1;
FIGURE 3 is a plan view of same;
FIGURE 4 is an explanatory perspective view;
FIGURE 5 is a schematic perspective view of an element according to the invention, for an embodiment;
FIGURE 6 is a cross-sectional view of the element illustrated in FIGURE 5;
FIGURE 7 is a partial longitudinal section of the element illustrated in FIGURE 5;
FIGURE 8 is a schematic perspective view of an element according to the invention, to a first means of utilization;
FIGURE 9 is a plan view of said element;
FIGURE 10 is a view similar to that illustrated in FIGURE 8, but for another arrangement of the element;
FIGURE 11 is a view similar to that of FIGURE 9;
FIGURE 12 is a side view of an element according to the invention, but for yet another arrangement;
FIGURE 13 is a schematic perspective view of an assembly of elements according to the invention;
FIGURE 14 is a sectional schematic view of one form of assembly of elements according to the invention;
FIGURE 15 is a view similar to that of FIGURE 14, but for another form of assembly;
FIGURE 16 is a schematic view, similar to those illustrated in FIGURES 14 and 15, but for still another form of assembly;
FIGURE 17 is a view similar to that of FIGURE 16, but for another embodiment;
FIGURE 18 is a very schematic view of a porch or portico built using elements according to the invention;
FIGURES 19, 20, 21, 22, 23 are schematic views similar to that of FIGURE 18 and illustrating various means for assembling together a number of elements according to the invention;
FIGURE 24 is a longitudinal sectional view of an assembly of elements according to the invention;
FIGURE 25 is a cross-sectional schematic view of an assembly of elements according to the invention, but for another embodiment of the assembly;
FIGURE 26 is a view similar to that illustrated in FIGURE 25, but for another embodiment;
FIGURE 27 is a view similar to those illustrated in FIGURES 25 and 26, but for still another embodiment of the invention.

Reference is first made to FIGURES 1 to 3. The building element according to the invention, 10, which can be made from any convenient material (concrete, plywood, metallic plate, asbestos-cement, plastics, glass, ceramics etc.) comprises a thin elongated shell 11 of substantially constant thickness, externally limited by a surface 12 and internally limited by a surface 13, both of which are smooth surfaces. The outer surface 12 presents rectilineal edges 14, 15 and 16, the latter being inclined in relation to edge 14. At its front and rear ends, element 10 comprises two flat portions or tympanums, 17 and 18, respectively, which are transverse to the longitudinal plane of symmetry of the element and the contour of which is that of a curvilinear triangle, with sides 19, 20 and 21 for tympanum 17, and sides 22, 23 and 24 for tympanum 18. Surface 12, which is symmetrical in relation to a mean longitudinal plane passing through edge 14 is advantageously formed as a smooth surface with double inverse curvature in such a manner that its sections, in planes parallel to those of the end tympanums have progressively decreasing areas when one moves from one tympanum to the other, for instance from tympanum 17 towards tympanum 18.

The contour of the element according to the invention, in a base plane defined by two edges of the element, for instance 15 and 19, is a rectangle with sides 15, 16, 19, 22.

The invention also contemplates to provide an element the outline of which, in the base plane, is a parallelogram (as indicated in dotted lines in FIGURE 3), with sides 15′, 16′, 19′, 22′, or a triangle or a trapezium.

Reference is now made to FIGURES 4 to 7, relative to a preferred embodiment of a building element according to the invention.

Element 40, made for instance of concrete, although this indication concerning the material is by no means restrictive, comprises a hollow, skew body or shell 39 of a substantially constant thickness, limited by two lateral outer and inner surfaces 37 and 38, respectively, and two flat end portions or tympanums 41 and 42. The skew surface used for defining the outer and inner surfaces of element 40 is advantageously composed of two hyperbolic paraboloid portions (FIGURE 4), a first portion 43 defined by the skew quadrilateral with sides 44, 45, 46 and 47, and a second portion 50, symmetrical to portion 43 with respect to a mean longitudinal plane passing through the straight line 46 and perpendicular to the straight line 45.

Portion 50 is thus limited by sides 46, 51, 52 and 53 of the skew quadrilateral which is symmetrical of the skew quadrilateral limiting surface 43 with respect to the above mentioned plane of symmetry.

The sections of the outer and inner surfaces 37 and 38 limiting the shell 39 by planes, perpendicular to the plane of symmetry are hyperbolas, as can be seen in FIGURE 7 and the sections of said surfaces by planes which are perpendicular to the mean longitudinal plane are triangles (FIGURE 6).

The present invention takes advantage of this latter property to limit element 40 at one of its ends by a first flat portion or tympanum 41 the contour of which is a triangle with sides 55, 56 and 57, and at the other end by a second tympanum 42 the area of which is smaller than that of tympanum 41, also triangular in shape and having sides 58, 59 and 60. The invention contemplates advantageously the use of apertured tympanums 41 and 42, thus resulting in a lighter element, without interfering with the qualities of resistance and rigidity. The angle formed by the edge 46 of intersection of the hyperbolic paraboloids with the orientation of the planes of the tympanums, is chosen according to the modes of assembly of the elements in relation to each other or to supporting elements. The tympanums 41 and 42 ensure, on the one hand, the general balance of the element and, on the other hand, the resistance of the element to the applied stresses, particularly to the relatively important unsymmetrical stresses which result from the normal use of the buildings and/or their exposure to climatic action (snow, wind, etc.).

The resistance effect provided by tympanums 41 and 42 is particularly important when the material of which the element is made—for instance a metallic plate such as aluminum or a material such as polyester—results in very light elements the weight of which may range from 1 to 2 lbs. per square foot, whereas unsymmetrical forces due to the wind may be from five to ten times greater.

The invention also provides an increase of the resistance and rigidity of the element, by means of rectilineal ribs applied along the edges 61, 62 and 63 of the shell 39 of the element, said ribs being fixed to the tympanums 41 and 42 at their ends, 64 and 65 for edge 61, 66 and 67 for edge 62, and 68 and 69 for edge 63, respectively.

The projection of the contour of such an element on a base plane defined by two edges of the element, say 57 and 61 is a rectangle with sides 57, 60, 61 and 63. This feature enables through the assembly of elements along edges 61 and/or 63, the covering of large size rectangular surfaces with elements the length of which may vary between 16 to 26 feet approximately, the width being about 8 feet and the thickness of which can be measured in a few sixteenths of an inch according to the material used, although these numerical data are by no means restrictive.

In a variation, the elements according to the invention are such that their contour on a base plane is not a rectangle but a trapezium or a triangle. When assembled side by side, such elements allow the covering of polygonal surfaces and not only rectangular ones.

Reference is now made to FIGURES 8 to 13, which show, by way of example, various modes of utilization and of assembly of building elements according to the invention.

In FIGURES 8 and 9, there is shown an element according to the invention, 75, fixed by its large size tympanum 76 on a foundation block 77, the fixing of the element taking place at three points indicated at 78, 79 and 80. Such a fixed element transmits, without any risk of buckling and in spite of its small thickness, the forces applied to it at its upper portion, for instance the weight of a beam, as schematically indicated at 81. In a variation (FIGURES 10 and 11), an element 82 can be hinged at 83 by its small tympanum 83′ on a foundation block 84. In either case, the side by side juxtaposition of a plurality of elements according to the invention, whether fixed or hinged by their tympanums on a foundation block, provides a self-bearing wall. Due to the presence of the end tympanums, the assembly or disassembly of an element according to the invention, on a foundation block for instance, are extremely simple, thus allowing the use of said elements for the building of light constructions, which may, however, be subjected to substantial stresses.

An element according to the invention can also be positioned with its tympanum parallel to a vertical plane, in which case the element finds application for the construction of consoles or canopies, as indicated in FIGURE 12 where element 85 is secured by its large size tympanum to a vertical wall 86 at three points, 87, 88 and 89. The juxtaposition of elements 90 and 91, similar to element 85, also fixed by their large size tympanums to wall 86, and therefore in an overhanging position (FIGURE 13) allows the construction of a canopy.

Of course, the elements according to the invention can either be fixed or hinged, not only to vertical or horizontal members, but also to slanting members, said elements offering, due to their construction, a good resistance to lateral stresses such as wind, earth pressure or liquid buoyancy.

The invention also contemplates the association of elements as illustrated in FIGURES 14 to 23. In FIGURE 14, an element 95 and an element 97 are shown in abutting relationship by their large size tympanums 96 and 98 respectively, the tympanums being linked together by any appropriate means. This type of embodiment, in which the open part of the elements is upwardly turned, in particularly advantageous for acting as a support for a floor or slab 99, adapted to rest on elements 95 and 97. Another method of assembly, illustrated in FIGURE 15, wherein elements 100 and 101 are abutting by their tympanums 102 and 103, respectively, with downwardly facing openings, is convenient for constructing a ceiling 104.

Other embodiments of elements according to the invention, as illustrated in FIGURES 16 and 17, are suitable for the construction of inwardly slanting roofs by juxtaposition of elements 95′ and 97′ (FIGURE 16), or of outwardly slanting roofs, by juxtaposition of elements 100′ and 101′ (FIGURE 17).

By using elements according to the invention, assembled together as shown in FIGURE 18, one can also build a portico with three hinged portions 105, 106, 107, each half of the portico comprising two elements 108 and 109 linked by their large size tympanums 110 and 111, respectively, said tympanums being rendered integral by any suitable means, and the two halves of the portico being joined by a hinged portion 106 provided on the facing small size tympanums. Such a portico rests on the ground 112 at hinged portions 105 and 107 and the juxtaposition side by side of such portico elements permits the easy mounting of open ended hangar type constructions.

In FIGURES 19 and 23 are illustrated various embodiments of building structures as obtained by the use of elements according to the invention. FIGURE 19 shows two elements 113 and 113′ according to the invention, assembled together by their large size tympanums and the small size tympanums of which rest on the ground at hinge points a and a′. In FIGURE 20, two element 114 and 114′ according to the invention have been schematically illustrated, joined together by their large size tympanums and two elements 115 and 115′ joined together in a similar manner, said elements being united on a hinge portion b by the opposite small size tympanums of elements 114′ and 115′.

In the embodiments of FIGURES 21 and 22, the building elements according to the invention 116 and 116′ are not identical and their connection by means of their respective large size tympanums enables to obtain an element of a portico if a support 117 (FIGURE 21) is added or a canopy element. As illustrated in FIGURE 23, elements 118₁, 118₂, 118₃, when assembled together, as decribed in connection with FIGURE 18, are superimposed to form a framework or a multiple portico.

Reference is now made to FIGURES 24 to 27, concerning assembling methods of elements according to the invention.

In FIGURE 24 there is illustrated the anchoring of a vertical bearing element 121, hinged at its base on a foundation block 120′. The small size tympanum 120 of element 121, comprising a through hole 122, rests, with the interposition of a resilient washer 123, on a concrete block 124 which serves for the locating of the anchor bolt 125 in block 120′. A nut 126 co-operates with the external threaded end of anchor bolt 125 for fixing element 121. The large size tympanum 127 which is advantageously provided with an aperture 128 is, in the case of the illustrated canopy arrangement, fixed to the large size tympanum 129 of an adjacent element 130 by screws and bolts 131.

In the case where the assembly of adjacent elements is carried out, not by their respective tympanums but along the lateral sides of the shells or bodies of said element, the invention also contemplates the linking together of elements 135 and 136 by means of a support 137 to which elements 135 and 136 are respectively fixed by screws or by any other suitable means. Seals 140 and 141 are advantageously provided between the support and the elements according to the invention, as well as a seal 142 in contact with the edges of elements 135 and 136.

When the elements according to the invention are used for the construction of roofs, one of the reinforcing ribs of element 151 (FIGURE 26) is given the shape of a gutter 150, the juxtaposition of both elements 151 and 152, with the interpositioning of a seal 153 thus giving, directly, a channel for rainwater collecting and drainage.

When elements according to the invention are made out of metallic sheet, such as raw or corrosion protected steel plate for instance, or of aluminum or copper sheeting etc. and when these elements are used for the construction of roofs, the longitudinal edges of elements 160 and 161 are provided with U-shaped ribs 162 and 163 respectively (FIGURE 27) for mutual interlocking during assembly of adjacent elements.

The element according to the invention can be made out of any material offering good mechanical compressive or tensile resistance qualities, such as reinforced or prestressed concrete, asbestos cement, plywood, metallic plate, ceramics, or any plastic material whether reinforced or not, although the above enumeration is by no means restrictive.

Elements according to the invention may also be used as forms when pouring thin concrete webs for reinforced concrete structures, such forms, due to their own resistance and self-bearing qualities, only needing a relatively simple staying in comparison to standard form stayings.

What is claimed is:

1. An elongated building element comprising two lateral walls joined along a common rectilinear edge, each of said walls being shaped as a surface with opposite double curvature, a first planar end tympanum transverse to said edge and connected to two respective ends of said lateral walls and a second planar end tympanum transverse to said rectilinear edge and connected to two other respective ends of said lateral walls to define a thin shell having a planar opening at its side opposite said rectilinear edge, which opening is bounded by edges of the lateral walls and the tympanums and has a quadrangular planar outline, the edges of the lateral walls being rectilinear and oblique with respect to said rectilinear edge along which the lateral walls are joined.

2. A building element according to claim 1, in which the lateral walls are shaped as portions of hyperbolic paraboloids, one generatrix of which is common rectilinear edge.

3. A building element according to claim 1, in which the opening in said shell opposite said rectilinear edge has a rectangular contour.

4. A building element according to claim 1, in which the opening opposite said rectilinear edge has the shape of a trapezoid.

5. A building element according to claim 1, in which the opening opposite said rectilinear edge has the shape of a parallelogram.

6. A building element according to claim 1, in which the edges of the lateral walls opposite said rectilinear edge include means for stiffening said walls.

7. A building element according to claim 1, in which at least one of the lateral walls includes at its edge opposite said rectilinear edge an elbow in the shape of a U to form a gutter.

8. A building element as claimed in claim 1 in combination with a support block and means for connecting said element with said block with one of said tympanums placed against said block.

9. An element as claimed in claim 1 wherein the end tympanums are of different dimensions and formed as curved triangles positioned transversely of said rectilinear ridge.

10. An assembly of at least two building elements as claimed in claim 1 comprising means assembling said two elements with a tympanum of the first element placed against a tympanum of the second element.

11. An assembly of at least two building elements as claimed in claim 1 comprising first means along a longitudinal edge of the lateral wall of one element and, second means for engaging said first means and formed along a longitudinal edge of the second element to assemble said two elements along said longitudinal edges.

References Cited

UNITED STATES PATENTS

| | | | |
|---|---|---|---|
| 1,115,588 | 11/1914 | Scott et al. | 52—731 |
| 1,545,456 | 7/1925 | Rastetter | 52—301 |
| 2,181,938 | 12/1939 | Fine | 52—730 |
| 2,574,241 | 11/1951 | Bobst | 52—731 |
| 2,870,793 | 1/1959 | Bailey | 52—727 |
| 2,874,812 | 2/1959 | Clevett | 52—731 |
| 3,039,414 | 6/1962 | Rosanes | 52—720 |
| 3,344,564 | 10/1967 | Siegal | 52—13 |

FOREIGN PATENTS

| | | |
|---|---|---|
| 8,837 | 6/1887 | Great Britain. |
| 503,705 | 6/1951 | Belgium. |
| 1,254,493 | 1/1961 | France. |
| 399,658 | 7/1924 | Germany. |
| 713,247 | 7/1965 | Canada. |
| 1,052,660 | 3/1959 | Germany. |

OTHER REFERENCES

Engineering News Record, Jan. 1, 1953, p. 25.

FRANK L. ABBOTT, Primary Examiner

JAMES L. RIDGILL, Jr., Assistant Examiner

U.S. Cl. X.R.

52—86, 726